United States Patent [19]
Cerutti et al.

[11] 3,898,069
[45] Aug. 5, 1975

[54] POSITIVE CONTAINMENT THRESHOLD FOR USE IN GLASS MANUFACTURING APPARATUS

[75] Inventors: Richard L. Cerutti, Seminole; Joseph A. Gulotta, New Kensington, both of Pa.

[73] Assignee: PPG Industries, Inc., Pittsburgh, Pa.

[22] Filed: Mar. 27, 1974

[21] Appl. No.: 455,441

[52] U.S. Cl............................................. 65/182 R
[51] Int. Cl............................................ C03b 19/02
[58] Field of Search............... 65/99 A, 182 R, 65 A

[56] References Cited
UNITED STATES PATENTS

| | | | |
|---|---|---|---|
| 710,357 | 9/1902 | Heal.................................. | 65/182 R |
| 789,911 | 5/1905 | Hitchcock......................... | 65/182 R |
| 1,564,240 | 12/1925 | Hitchcock......................... | 65/182 R |
| 3,485,614 | 12/1969 | Long.................................. | 65/99 A |
| 3,508,902 | 4/1970 | Cusick .............................. | 65/182 R |
| 3,567,414 | 3/1971 | Lajarte.............................. | 65/99 A |
| 3,743,495 | 7/1973 | Swillinger......................... | 65/182 R |

*Primary Examiner*—Robert I. Lindsay, Jr.
*Attorney, Agent, or Firm*—E. Kears Pollock

[57] ABSTRACT

A positive containment threshold for use in an apparatus for manufacturing flat glass includes a metal base with a combination of vertically disposed members for connection to a bottom casing of a glass forming chamber. Disposed about a vertical member which serves as a dividing member in the combination are refractory threshold blocks which provide a smooth glass contact surface over which molten glass may be delivered onto a pool of molten metal contained within the bottom portion of an enclosed forming chamber. This threshold in combination with the casing surrounding the bottom portion of an enclosed forming chamber provides an impervious barrier to prevent the inadvertent loss of molten metal from the container in the event of refractory failure.

6 Claims, 7 Drawing Figures

POSITIVE CONTAINMENT THRESHOLD FOR USE IN GLASS MANUFACTURING APPARATUS

BACKGROUND OF THE INVENTION

1. Field of the Invention

The present invention relates to apparatus for manufacture of flat glass wherein the glass is formed while being supported on a surface of a pool of molten metal following delivery thereto as molten glass flowing in a substantially horizontal stream from a glassmaking furnace. More particularly, this invention relates to a combination of elements comprising suitable means for supporting molten glass for delivery onto a pool of molten metal.

2. Brief Description of the Prior Art

It is known that molten glass can be delivered onto molten metal and formed into a continuous ribbon or sheet of glass according to the teachings of Heal, U.S. Pat. Nos. 710,357; of Hitchock, 789,911; of Pilkington, 3,083,501 and 3,220,816. In all of the prior art, molten glass is delivered over some rigid element, usually a refractory member, onto molten metal. In the practice disclosed by Pilkington, the molten glass is delivered through a long, narrow canal and over a lip from which the molten glass falls onto the molten metal and spreads outwardly on the molten metal. The forming chamber containing the molten metal extends upstream toward the source of molten glass in the apparatus disclosed by Pilkington. In the method of Hitchcock, the molten glass is delivered over a refractory wall onto molten metal contained in a forming chamber adjacent to such a refractory wall downstream of the furnace in which the molten glass is prepared. In the method of Heal, molten glass is delivered over a refractory bridge.

According to the disclosure of Hitchcock in U.S. Pat. No. 1,564,240 the molten metal on which glass is to be formed into a continuous sheet may be contained within a forming chamber comprising a metal casing. As described in U.S. Pat. Nos. 3,854,475 and 3,594,147 to Galey and Sensi, this metal casing may be provided with a refractory liner. Refractory-lined metal casing structures are shown and described in U.S. Pat. No. 3,584,477 to Hainsfurther.

The bottom portion of a typical forming chamber which contains molten metal on which glass is to be formed includes a bottom, side members and end members and is in the form of an open-topped box. A top portion of a typical forming chamber includes a top, sides and end which are sealed to the bottom portion in order to provide an enclosed forming chamber. Because the canal and lip through which and over which molten glass flows prior to being deposited on the molten metal extends above the surface of the molten metal and inwardly from the inlet end of a forming chamber over the molten metal, it is quite easy in a mechanical sense to provide a casing for the bottom portion of a forming chamber such as described by Pilkington, Hainsfurther or Galey and Sensi. Such a casing extends above the intended level for the molten metal pool within such a forming chamber.

According to the teachings of Hitchcock, molten glass is delivered directly through a front wall in a furnace and onto molten metal in an enclosed forming chamber. The front wall of the furnace is a common wall to the enclosed forming chamber, constituting an inlet end wall thereof. Because of the necessarily high temperature of molten glass in the furnace as it is delivered to the enclosed forming chamber, this common wall is necessarily a refractory wall. Such a wall is subject to deterioration during use and it may be readily observed that any leak developing in such a common wall beneath the level of the surface of the molten metal pool within the enclosed forming chamber will result in the loss of molten metal into the bottom of the adjacent glassmaking furnace. This is so since the molten metal is fluid and is more dense than molten glass. In the apparatus of Heal, molten glass is delivered over a refractory bridge. Failure of the downstream wall of the bridge would result in a massive loss of molten metal.

The apparatus disclosed in Heal and that disclosed in Hitchcock are not provided with means for supporting a stream of molten glass for delivery onto molten tin which can be maintained or replaced when worn without requiring a tear-down and replacement of the entire front wall of a glassmaking furnace. As disclosed in the copending application of Charles K. Edge and Gerald E. Kunkle, entitled "Flat Glass Manufacturing Apparatus and Method," Ser. No. 455,463 filed on even date herewith and incorporated by reference herein, it is desirable to provide a means for delivering molten glass from a glassmaking furnace to a glass forming chamber that is sufficiently independent of either the glassmaking furnace or the glass forming chamber so that it may be individually maintained. Thus, it is desirable to provide a molten glass delivery means that includes a bottom portion that effectively extends the bottom portion of the glassmaking furnace and is connected to the bottom of a glass forming chamber. Such a delivery means also includes side members and a roof which is connected to both the glassmaking furnace and the glass forming chamber. The delivery means further includes means for metering the flow of molten glass through it in order to control the rate of glass production.

In the copending application of Edge and Kunkle which is incorporated by reference herein, there is a description of a suitable apparatus for delivering molten glass from a glassmaking furnace to a glass forming chamber. Such an apparatus comprises a bottom threshold member, side members or jambs extending upwardly from the threshold member and a metering member extending downwardly toward the threshold member. These elements, in combination, define an opening through which molten glass may flow. The threshold member preferably rests on an extended section of the front wall of a glassmaking furnace and against the inlet end of a glass forming chamber. As will be seen from the description which follows, the present invention provides a threshold member having particularly desirable characteristics.

SUMMARY OF THE INVENTION

A threshold apparatus for use in combination with a glass forming chamber is provided. The threshold apparatus includes an elongated impervious base member, an impervious dividing member connected to the base member and extending along its length and a pair of impervious end members connected to both the dividing member and the base member so that the combination forms a box-like structure with a portion of the base member extending both into the box-like structure and out from it. Two refractory blocks are positioned on the base member, one on each side of the dividing member. These are held in fixed relation to one another and to the metal members to form a glass-contacting surface comprising their surfaces which face away from the base member.

When used in combination with a glass forming chamber, the base member and the end members are connected to an impervious metal casing that encloses the bottom portion of the forming chamber. In general, such a casing will include a bottom surface portion, two side portions, an outlet end portion and partial inlet end portions extending inwardly from the sides of the casing and leaving an opening in the central portion of the inlet end for receiving the refractory portion of the present threshold. The base member and end members of the threshold apparatus are connected to the forming chamber casing by impervious connections. For example, when employing a metal chamber casing, the threshold base member and end members are metal and are welded to the chamber casing.

The elongated base member and dividing member preferably extend beyond the refractory blocks that form the glass-contacting surface. The end members may then be located far enough beyond the ends of the refractory blocks to provide a space for receiving the bottom portions of the jambs or side members of the delivery means.

The base member may be of less width than the combined width of the refractory blocks so that the downstream block (that block closest to the forming chamber) extends past the base member. The base member can then rest on another base or support member that is welded to the chamber casing and a castable refractory may be placed in the space between the support member and the refractory block in the space formed due to the narrow base member. In this way it is unnecessary to weld the base member along its entire length to the chamber casing. Since the welding of this long seam is inconvenient, this particular embodiment of the invention has particular utility during construction of a glass forming facility.

The base member and the dividing member may include means for maintaining temperature control over the apparatus. The dividing member may be hollow and comprise a box-like structure having an inlet and an outlet for coolant. During use, a coolant, such as water, a heavy alcohol, or an oil, may be directed through the hollow dividing member to maintain its temperature. All or part of the base member may be of similar construction and may be cooled in like manner. Alternatively or additionally a heating element, such as electrical resistance heating elements, may extend through the threshold. One advantage of providing means for thermal control is that the structural integrity of the refractory blocks may be maintained by preheating them before molten glass is delivered over them and by maintaining them at temperatures within a suitable range to avoid undue expansion and contraction of the blocks during use. Another advantage of thermal control of the threshold blocks is that the temperature of the molten glass is controlled as well.

The space between the refractory blocks above the dividing member may be filled with a refractory cement or castable refractory material. An inert metal plate, such as a platinum plate, may extend along the joint between the refractory blocks to provide a continuous surface for glass contact that prevents glass from entering the space between the refractory blocks. This prevents the devitrification of glass in the threshold joint.

In another embodiment of this invention the space between the refractory members may be filled with molten metal, such as molten tin. This molten metal can be isolated from the vertical member by a layer of castable refractory.

This invention may be more fully understood with reference to the accompanying drawings.

DESCRIPTION OF THE PREFERRED EMBODIMENTS

Figure 1:
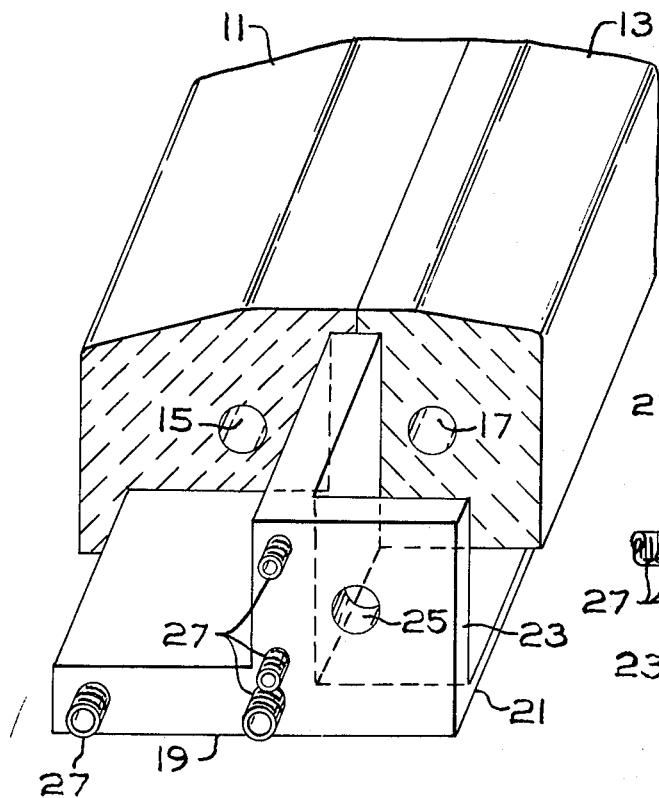
FIG. 1 is a partial perspective view of a threshold according to this invention.
Figure 2:
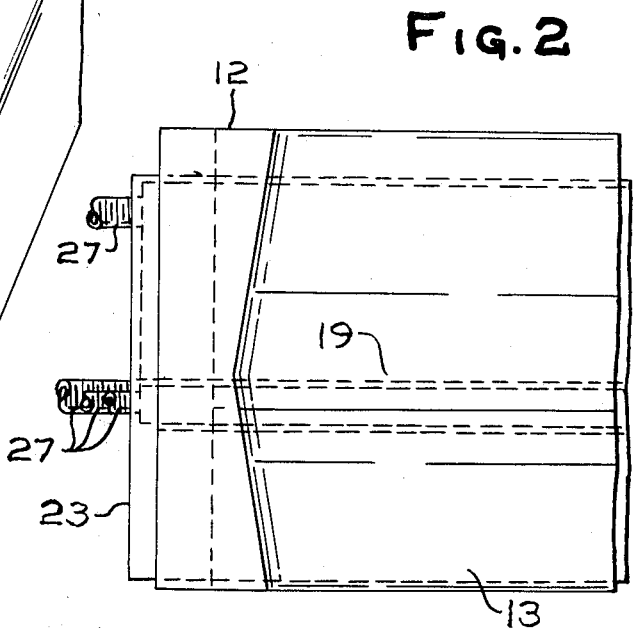
FIG. 2 is a partial plan view of a threshold in combination with a jamb or side member of a delivery means according to this invention.
Figure 4:
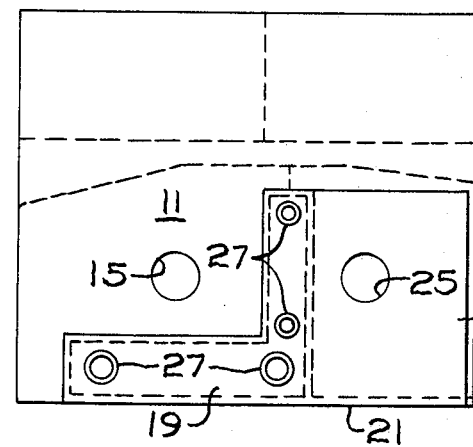
FIG. 4 is a longitudinal elevation view of the threshold and jamb shown in FIGS. 2 and 3.
Figure 3:
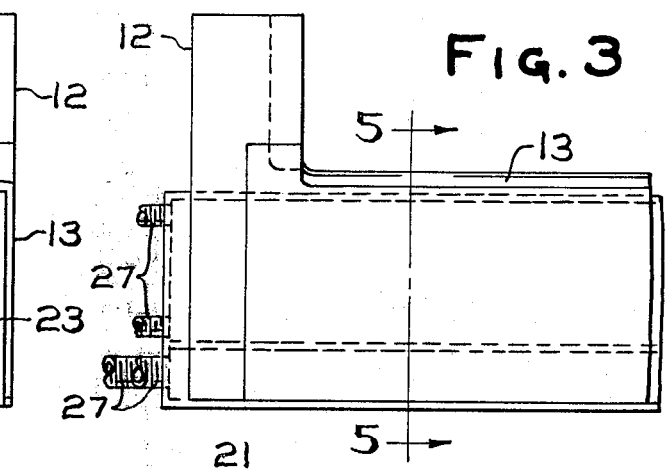
FIG. 3 is a transverse elevation view of the threshold and jamb shown in FIG. 2.

Referring now to FIGS. 1–4, there is shown a preferred embodiment of this invention.

A threshold comprises two refractory blocks 11 and 13. They are used in a molten glass delivery device including jambs 12. Each of the threshold blocks preferably includes a transverse hole 15 and 17 for receiving a coolant pipe or the like.

The refractory blocks 11 and 13 are mounted against a dividing member 19 and rest on a base member 21. The dividing member 19 separates one refractory block 11 from the other refractory block 13 and extends along their transverse lengths and sufficiently beyond them to receive a jamb or side member 12.

The dividing member 19 is fixed to the base member 21 along its length. The dividing member extends upward from the base member approximately perpendicularly although it could satisfactorily extend from it at some other angle. The dividing member 19 extends up from the base member sufficiently so that its uppermost portion will be near, at or above the level of molten metal in a forming chamber with which it is used.

The base member 21 extends along the transverse length of the refractory members 11 and 13 and sufficiently beyond them to receive a jamb or side member 12 at each end. The base member may extend the full longitudinal width of the refractory members or may be narrower so that at least the downstream refractory block 13 extends over the edge of the base member 21. With such an overlap the threshold may be mounted on a structural ledge extending out from the casing of a forming chamber and a castable refractory may be used to seal the space under the extended block 13 and on top of the structural ledge. In the view shown in FIG. 1 jamb member 12 is removed and the ends of blocks 11 and 13 are cut away to more fully show the relationship of the blocks to the base.

End member 23 is connected to both the dividing member 19 and the base member 21 to form an open top, open face, box-like structure with its downstream face open for engagement with an opening in the casing of a forming chamber. An end member similar to end member 23 is connected to the base member and the dividing member at their ends opposite from the location of end member 23.

The end members 23 are provided with openings 25 for receiving cooling pipes or the like.

When installed in a glassmaking apparatus, the base member 21 and the end members are connected to the casing of a forming chamber. Generally the connections are welded seams as the casing and the base and end members are all metal, usually steel. The downstream portion of the base member (beneath block 13) preferably rests on a structural ledge connected to and extending from the forming chamber. The upstream portion of the base member (beneath block 11) preferably rests on the top course of blocks of a refractory front wall (basin wall portion) of a glass melting and refining furnace. The upstream portion is preferably "mudded" or sealed with field cast material to the furnace front wall after heatup of the furnace so that expansion of the furnace during heating will be accommodated by the threshold and front wall sliding against one another.

Either or both of the transversely extending metal members of the threshold may be hollow in order to accommodate coolant. As shown in the drawings both the dividing member 19 and the upstream portion of the base member 21 are hollow. The hollow sections of these members are provided with inlet and outlet connectors 27 to which coolant conduits, such as hoses or pipes, may be connected.

Figure 5:
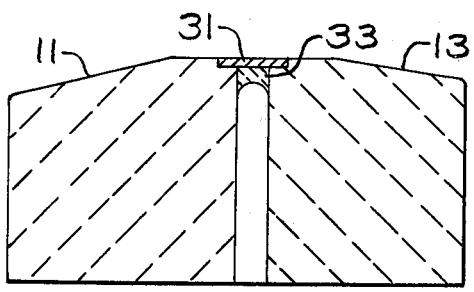
FIGS. 5 and 6 are longitudinal elevation views taken along section line 5—5 of FIG. 3 and showing particular embodiments of thresholds according to this invention.

In FIG. 5 there is shown a particularly preferred embodiment of this invention. In the space between the refractory blocks 11 and 13 is platinum plate 31 that partially overlays the blocks. A cast refractory material that seals the space and cements the blocks together is present beneath the platinum plate and the space for the dividing member 19. This embodiment is long lived and is virtually maintenance free.

Figure 6:
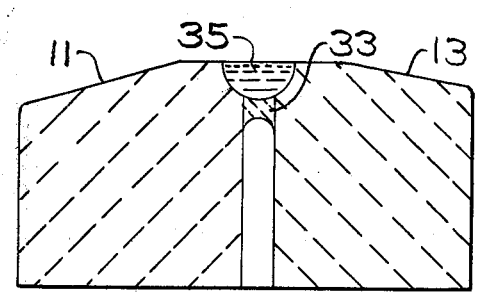

In FIG. 6 there is shown another preferred embodiment of this invention. In the space between the refractory blocks 11 and 13 is a cast refractory material 33 forming a trough extending transversely along the top of the threshold. During use this trough is filled with molten tin or the like as is present in the pool of molten metal in the forming chamber.

Figure 7:
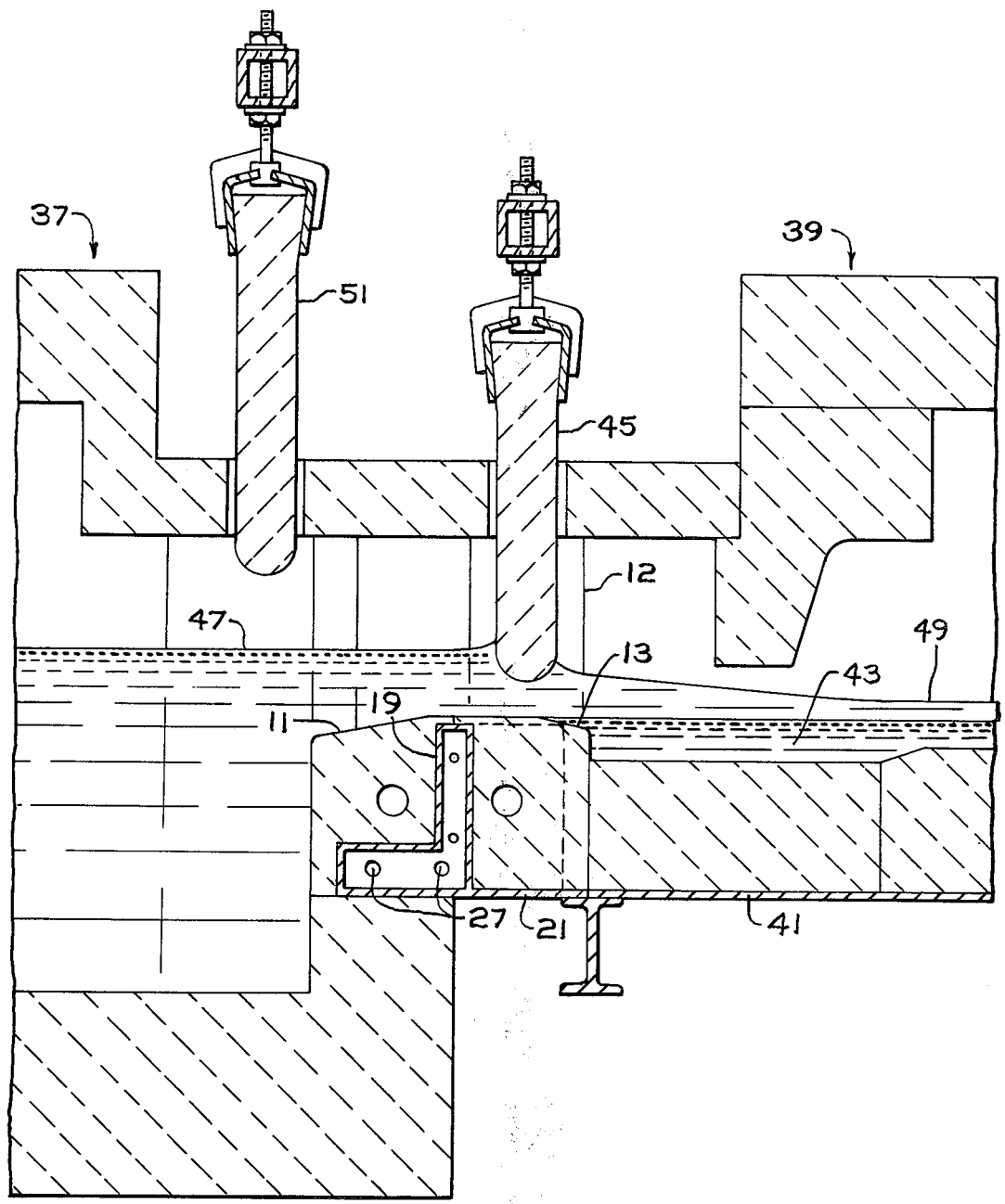

A threshold such as described here is mounted for use in the delivery section of a glassmaking apparatus in the manner shown in FIG. 7. The threshold blocks 11 and 13 extend across the delivery section and separate a refiner 37 from a glass forming chamber 39. The impervious base member 21 rests on a supporting structure and is connected to a casing 41 surrounding the bottom portion of the forming chamber. With the casing the base member 21 and dividing member 19 form a complete refractory lined, bottom shell for containing molten metal 43 in the forming chamber 39. The threshold blocks 11 and 13, along with the jambs 12 and a metering member 45, define an opening through which molten glass 47 is delivered to the forming chamber 39 for forming into a continuous sheet 49 of flat glass. A shutoff member 51 is also provided as shown.

In addition to what has already been described, it is possible to construct the present threshold apparatus to employ more than two refractory blocks. For example, two or more refractory blocks may be joined on one side of the dividing member to act in the combination as a single block. Thus, the present invention contemplates the use of a plurality of blocks joined together to act as a single block comprising one or both of the blocks in the pair mounted in the combination.

While this invention has been described with reference to particularly preferred embodiments, those skilled in the art will recognize variations that may be made without departing from the spirit or scope of this invention. Accordingly, this disclosure is intended to be illustrative, rather than limiting.

We claim:

1. In an apparatus for making flat glass comprising a glassmaking furnace for supplying molten glass and, connected to the furnace through a molten glass delivery means, a glass forming chamber for forming a continuous sheet of flat glass, wherein the forming chamber includes a pool of molten metal for supporting the glass during forming, the pool of molten metal being maintained on a bottom between sidewalls and at the end of the forming chamber connected to the furnace by a threshold, and wherein the threshold comprises an elongated member extending across the delivery means and providing an upwardly facing molten glass supporting surface having a long dimension extending across the delivery means and a short dimension extending in a direction from the furnace to the forming chamber; the improvement wherein the threshold comprises:
   a. an elongated, impervious metal base member extending across the delivery means and connected to the bottom of the forming chamber;
   b. an impervious metal dividing member connected to and extending along the length of said base member, said dividing member extending substantially perpendicularly upwardly from said base member;
   c. a pair of impervious metal end members, each connected to said base member and to said dividing member and extending substantially perpendicularly from both said base member and said dividing member, one of said end members being in the vicinity of one end of said base member and the other of said end members being in the vicinity of the other end of said base member; and
   d. two refractory blocks positioned one on each side of said dividing member and held in fixed relation thereto to form a glass contacting surface comprising the surfaces of said blocks facing away from said base member.

2. The apparatus according to claim 1 wherein the base member and the dividing member extend sufficiently beyond the refractory blocks to receive a pair of refractory side members, one between the refractory blocks and one end member and one between the refractory blocks and the other end member.

3. The apparatus according to claim 1 wherein said dividing member is provided with means for cooling the apparatus.

4. The apparatus according to claim 3 wherein said dividing member is a hollow structure having connections for providing coolant thereto and for carrying coolant therefrom.

5. The apparatus according to claim 1 wherein said refractory blocks are joined together by a platinum plate covering their edges defined by their surfaces facing said dividing member and their surfaces facing away from said base member.

6. The apparatus according to claim 1 wherein said refractory blocks are spaced one from the other and extend beyond said dividing member away from said base member and wherein the apparatus further comprises a castable refractory disposed between said refractory blocks and adjacent said dividing member forming a space defined by said castable refractory and said refractory blocks for receiving molten metal.

* * * * *